S. L. FARRAR.
Steam-Cooker.
No. 221,542.   Patented Nov. 11, 1879.
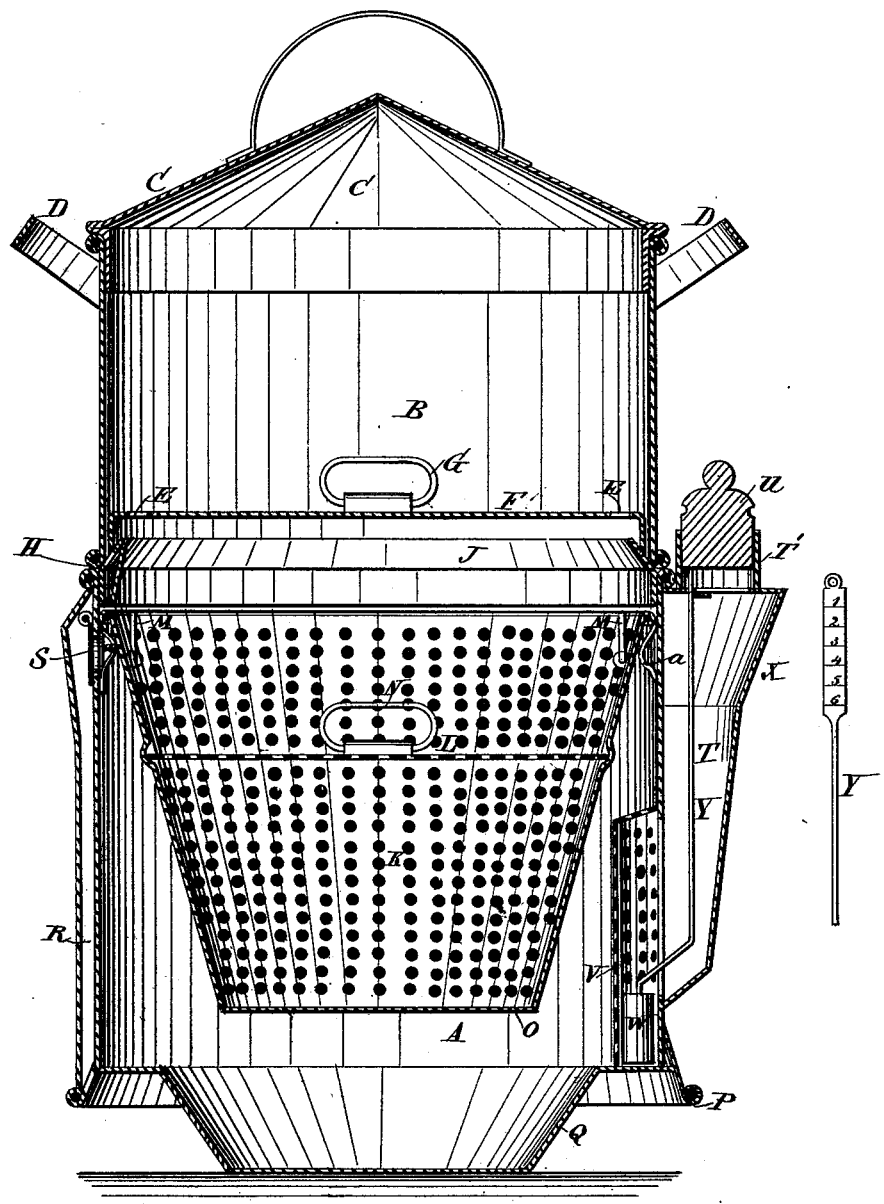

UNITED STATES PATENT OFFICE.

SANFORD L. FARRAR, OF BATH, ASSIGNOR TO HIMSELF AND N. H. LANDERS, OF AUBURN, MAINE.

IMPROVEMENT IN STEAM-COOKERS.

Specification forming part of Letters Patent No. 221,542, dated November 11, 1879; application filed May 15, 1879.

*To all whom it may concern:*

Be it known that I, SANFORD LIBBY FARRAR, of Bath, in the county of Sagadahoc and State of Maine, have invented a new and Improved Steam-Cooker, of which the following is a specification.

The object of my invention is to provide an improved steam-cooker that can be easily handled and filled with water, and in which different foods may be cooked at the same time without impairing each other's qualities.

The invention consists in the arrangement of two kettles, one on top of the other, the upper one of which has a perforated movable bottom, gutter, and spout, and the lower one is provided with an escape-passage, valve, perforated casing, water-pipe, and studs, and contains a perforated movable kettle having a perforated removable bottom. The filling-tube of the lower kettle is provided with a float and a graduated rod for indicating the quantity of water in the kettle.

In the drawing a vertical cross-section of the apparatus is shown.

A is the lower, and B the upper, kettle. C is the lid, which will fit either kettle. D D are the handles. J is a metal gutter near the lower edge of the inner surface of the upper kettle.

A small spout, H, leads the water that collects in the gutter into the lower kettle, A. A movable bottom, F, provided with a circle of perforations, E E, near the edge, and a handle, G, in the middle, rests on this gutter.

The lower kettle, A, has several studs, *a*, on the inner side near the upper edge, on which rests a perforated kettle, K, provided with handles M M, solid bottom O, and a perforated movable intermediate bottom L, having a handle, N. The kettle A is further provided with a flange, P, and a depression, Q, in order to present more surface to the fire, and rest more firmly on the stove.

R is an escape-passage for the steam, and is provided with the valve S.

T is the water-feed pipe. It is provided with a funnel, X, and a neck, T', and closed by a stopper, U. The lower end terminates in the perforated casing V, which is on the inside and bottom of the kettle. In this part V is the float W, which is fastened to a graduated rod or strip, Y.

The operation is as follows: If the apparatus is to be used as a steamer or boiler, the upper kettle, B, and the inner perforated kettle, K, are removed, and the lid C placed on the lower kettle, A; but if it is to be used as a cooker the upper kettle, B, and perforated kettle K are restored to their respective places. One kind of food is placed on the perforated bottom F of the upper kettle, and another kind is placed on the intermediate floor L of the perforated kettle K. The stopper U is taken off, and the water poured into the kettle through the funnel X and tube T. The apparatus is then placed onto a fire, and the cooking begins. The steam that rises up into the upper kettle, B, will be condensed on the sides thereof and on the bottom P. The water thus formed will have to pass through the perforations E E, and will drop into the gutter J, from where the spout H will lead it down along the inner surface of A. Thus no water, gravy, grease, or liquid of any kind can drop from the food on the upper bottom, F, on that which lies on the bottom L. If there is an excess of steam, the same will escape through the valve S and canal R into the fire.

The height of water in the kettles can be ascertained at any time by removing the stopper U. The float W will then rise, and by means of the scale on the rod or strip Y will indicate the height of water. Thus the kettle can be filled at any time, and the quantity of water in the same can be ascertained without removing the lid, and a great saving in fuel, time, and labor is obtained.

All parts of the apparatus can be taken apart and readily cleaned.

Both kinds of food are cooked independently of each other without affecting the qualities of one another.

Having thus described my invention, I claim as new and desire to secure by Letters Patent—

1. The combination, in a steam-cooker, of the kettle B, provided with the perforated bottom F, the gutter J, and the spout H, the kettle A, provided with the escape-passage R, valve S, perforated casing V, water-pipe T, and studs $a$, and the perforated inner kettle, K, provided with the perforated removable bottom L, substantially as and for the purpose set forth.

2. The combination of float W, of scale Y, of tube T, and of stopper U, as and for the purpose described.

SANFORD LIBBY FARRAR.

Witnesses:
 A. A. MORSE,
 A. ROGERS.